United States Patent [19]

Straalsund

[11] 4,089,743

[45] May 16, 1978

[54] FLOW DUCT FOR NUCLEAR REACTORS

[75] Inventor: Jerry L. Straalsund, Richland, Wash.

[73] Assignee: The United States of America as represented by the United States Department of Energy, Washington, D.C.

[21] Appl. No.: 761,038

[22] Filed: Jan. 21, 1977

[51] Int. Cl.² .................. G21C 3/30; G21C 15/00; G21C 5/08
[52] U.S. Cl. ...................................... 176/78; 176/64; 176/85; 176/94
[58] Field of Search ................. 176/78, 76, 81, 84, 176/83, 85, 94, 64

[56] References Cited

U.S. PATENT DOCUMENTS

| | | | |
|---|---|---|---|
| 2,941,933 | 6/1960 | Roake | 176/83 |
| 2,969,312 | 1/1961 | Monson | 176/78 |
| 3,262,860 | 7/1966 | Zebroski | 176/78 |
| 3,378,453 | 4/1968 | Gorker | 176/83 |

Primary Examiner—Samuel W. Engle
Assistant Examiner—Donald P. Walsh
Attorney, Agent, or Firm—Dean E. Carlson; Ignacio Resendez; Richard E. Constant

[57] ABSTRACT

Improved liquid sodium flow ducts for nuclear reactors are described wherein the improvement comprises varying the wall thickness of each of the walls of a polygonal tubular duct structure so that each of the walls is of reduced cross-section along the longitudinal center line and of a greater cross-section along wall junctions with the other walls to form the polygonal tubular configuration.

6 Claims, 7 Drawing Figures

FLOW DUCT FOR NUCLEAR REACTORS

BACKGROUND OF INVENTION

This invention was made in the course of, or under, a contract with Energy Research and Development Administration.

The invention relates to an improved coolant flow duct for use in nuclear reactors.

In nuclear reactors such as liquid metal fast breeder reactors, flow channels or ducts for coolants are provided that are of polygonal shape. These polygonal configurations, such as hexagonally shaped flow channels, are used in order to provide adequate cooling to the fuel pins as well as to provide a means for removing of the fuel pins from the reactor and for refueling the reactors. The fuel pins are housed or contained within the flow ducts and a liquid coolant, such as sodium, is forced through these ducts or channels for cooling the fuel pins. This results in a pressure gradient from the bottom to the top of the fuel pin column. A major life limitation on the current duct design is the interference between adjacent ducts as a result of "bulging" creep deformation induced by irradiation creep mechanism and by the hydrostatic pressure gradient across the duct wall.

A major limitation in nuclear reactor core life is the excessive bulging deflections that occur in flow channels as a result of the pressure difference between the inside of the duct and the clearance space, which may be about 0.100 inch, between adjacent ducts. Adjacent ducts are not allowed to touch one another except at the load pads over the life of the fuel and/or the control rod assembly. The reasoning behind this criteria is the possibility of extreme difficulties in fuel handling operations in the event that significant interference or bulging occurs.

The bulging deflection mechanism is believed to be a bending deflection and, since the application temperature ranges are generally lower than about 1100° F, the bulging deformation mechanism is attributed to that of irradiation creep. This bulging phenomena is the major factor limiting core life of present design for breeder reactors.

While bulging deflections may be reduced simply by increasing the net cross-section of the duct, this may be done only at the expense of an increase in the total amount of steel in the core, which amount is to be desirably minimized, and at the expense of a subsequent reduction in the breeding ratio which is a critical measure of fast breeder reactor performance.

Increased spacing between ducts has also been considered; however, this would result in an increased volume fraction of sodium in the core and also give rise to decreased breeding ratios and overall core performance.

SUMMARY OF INVENTION

In view of the above, it is an object of this invention to provide an improved coolant flow duct having an increased breeding ratio while retaining the same life span as presently used ducts.

It is a further object of this invention to provide an improved flow duct having a life span that is 80% greater based upon a constant creep rate than state of the art flow ducts while retaining the same breeding ratio.

It is a further object of this invention to provide an improved flow duct having improved breeding characteristics and improved life span over presently used ducts.

It is a further object of this invention to provide an improved flow duct having aproximately 80% increase in life (based upon constant creep rate) with the same metal volume as currently used ducts.

Varius other objects and advantages will appear from the following description of an embodiment of the invention, and the most novel features will be particularly pointed out hereinafter in connection with the appended claims. It will be understood that various changes in the details, materials, and arrangements of the parts which are herein described and illustrated in order to explain the nature of this invention may be made by those skilled in the art without departing from the scope of this invention.

The invention comprises an improved coolant flow duct for use in a nuclear reactor, the improved duct being of elongated, polygonal, tubular configuration, the inner tubular walls of the polygon being flat, and the outer polygon walls having a concave configuration such that each of the walls is of reduced cross-section along the longitudinal center line of each wall and of greater cross-section along the wall end points adjacent the longitudinal center line to form the polygonal configuration.

DETAILED DESCRIPTION

Figure 1:
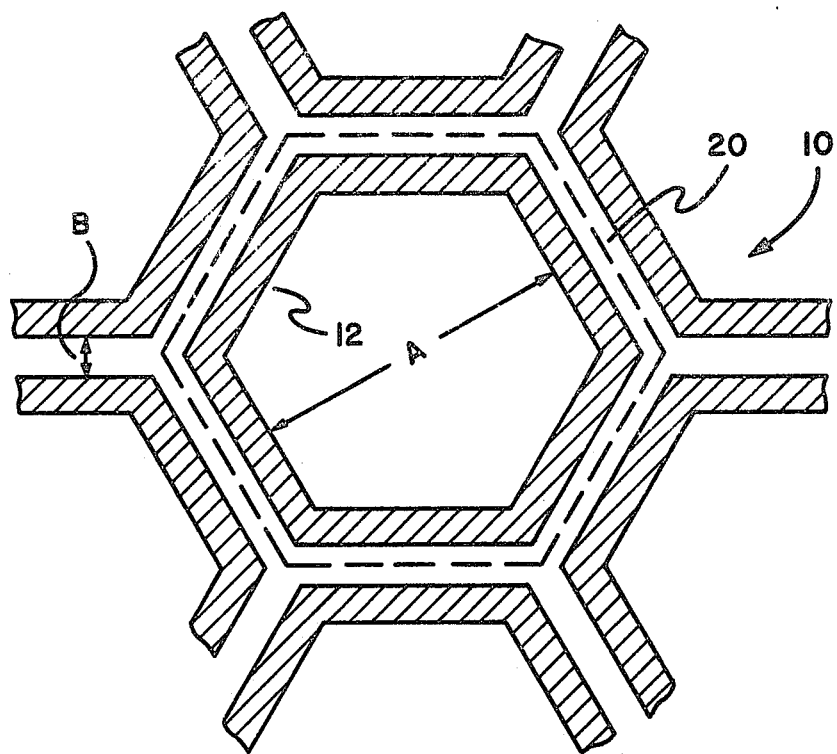
FIG. 1 illustrates an embodiment of presently used flow ducts.

The hexagonal flow duct 10 of FIG. 1 is used to house fuel pins and provides a passageway for a high temperature liquid coolant, such as liquid sodium, to cool the fuel pins. These flow ducts 10 provide a means for removing the fuel pins from the reactor and replacing them therein. The duct walls 12 are generally flat on the inside of the tubular structure as well as on the outside of the duct. The thickness of walls 12 typcially ranges from about 0.040 to about 0.120 inches. The thickness of the duct from one wall to an opposite wall dimension A in FIG. 1, generally ranges from about 2 to about 4 inches. There is a space provided (B) between flow ducts as assembled in the reactor so that walls of adjacent ducts are separated by a space of about 0.100 inches.

Figure 2:
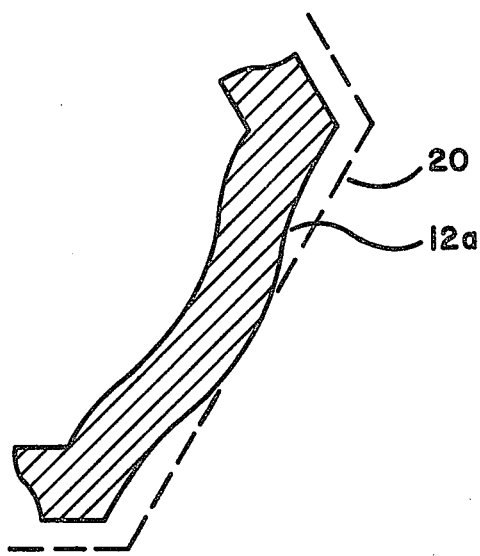
FIG. 2 illustrates the deformation of adjacent ducts which is a major limitation of the nuclear core for nuclear reactors.
Figure 3:
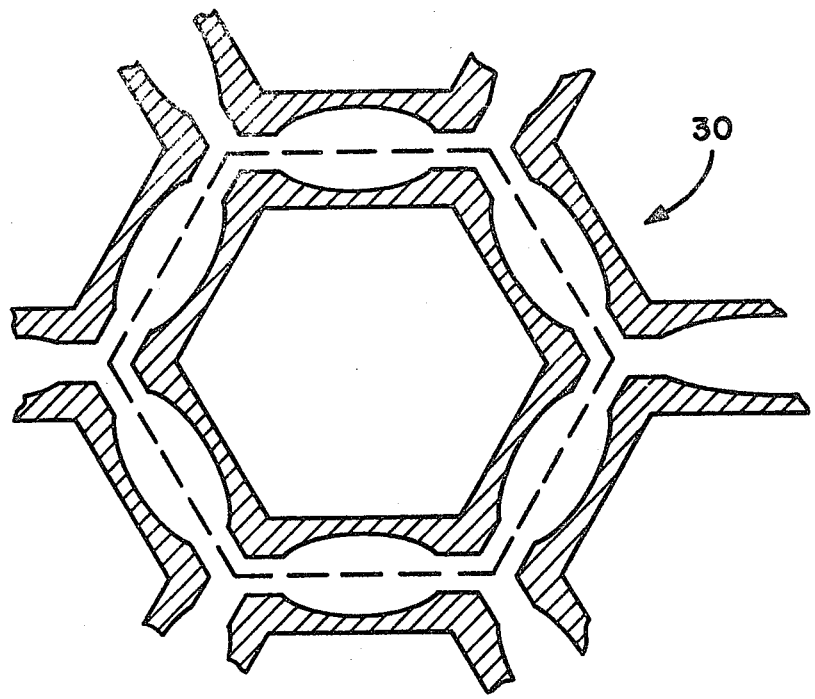
FIG. 3 illustrates, in cross-section, a portion of an improved flow duct of this invention.

Because of the minimal wall thickness and spacing between ducts as noted above, use of these ducts in a neutron irradiation environment at an elevated temperature and under conditions of high pressure passage of the liquid coolant through the duct passageway result in a deformation known as creep deformation which has the result of the duct walls bulging and contacting each other or infringing space envelope 20, defined by the locus of points equally spaced between adjacent ducts as illustrated in cross-section in FIG. 2. Space envelope 20 defines the maximum deflection which is permitted of the duct walls. As illustrated the space envelope comprises imaginary lines centered between adjacent ducts. In FIG. 2, duct wall 12a has deformed and, during the deformation, resulted in penetration of space envelope 20. Thus the duct life is exceeded when the duct wall penetrates the allowed spacing.

I have found that deflections may be minimized by providing an improved hexagonal channel with a variable duct wall thickness. For the same total volume of steel, the center deflection may be minimized by rearranging the thickness variation such that the thickness is larger in regions adjacent to the corners or junction of walls.

I have found that a major portion of the deflection is caused by bending near the corners of the duct section, and that very large gains in projected life may be obtained by increasing the thickness in the corner regions, or maintaining them the same as present thicknesses, while reducing the thickness in the center. This is contrary to the conclusion that would be arrived at if optimization for deflection alone were to be considered since this would result in increased thicknesses at the center and corners of the duct walls with the regions in between being reduced in section. Modification provided by this invention results in an increase of the rigidity of the duct wall and also provides substantial room for increased amounts of deflection at the center.

The precise optimum shape for maximum duct life is dependent on several factors including a number of other design parameters, such as the degree to which breeding ratio should be optimized, the pitch-to-diameter ratio of ducts, and the specific amount of swelling for which inter-duct clearance should be allowed, as well as the exact pressure drop and the bowing tolerance which should be accounted for in design and which, in turn, are a function of the load pad spacing, the temperature and flux gradients within the core, and the swelling behavior of the duct material. In providing a preferred embodiment of this invention, a duct configuration, described below was selected as a reference and the improved duct of this invention was optimized, although it is to be understood that by varying the above parameters, other configurations may be found to be optimum and would still be within the scope of this invention.

Present duct designs employ a hexagonal tubing configuration wherein the duct walls have a thickness of about 0.120 inches, and about 4.335 inch flat to flat distance between flat portions of the walls (corresponding to approximately 2.5 inch duct flat widths). The walls of the ducts are provided with an about 0.100 inch clearance between adjacent ducts. Thus there is a minimum of about 40 mils tolerance between duct walls and space envelope near the corner region for swelling and bowing deflections.

Current irradiation creep phenomena data supports the thesis that irradiation creep is essentially linear in stress. Therefore, the bulging deflections can be adequately accounted for by a pseudo-elastic analysis of the bending deflections for a free body.

Figure 4:
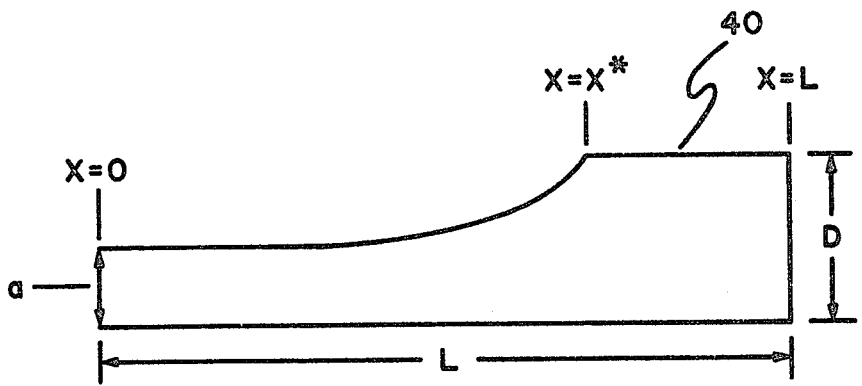
FIG. 4 illustrates the duct flat cross-section having the general geometry of the FIG. 4 embodiment.
Figure 5:
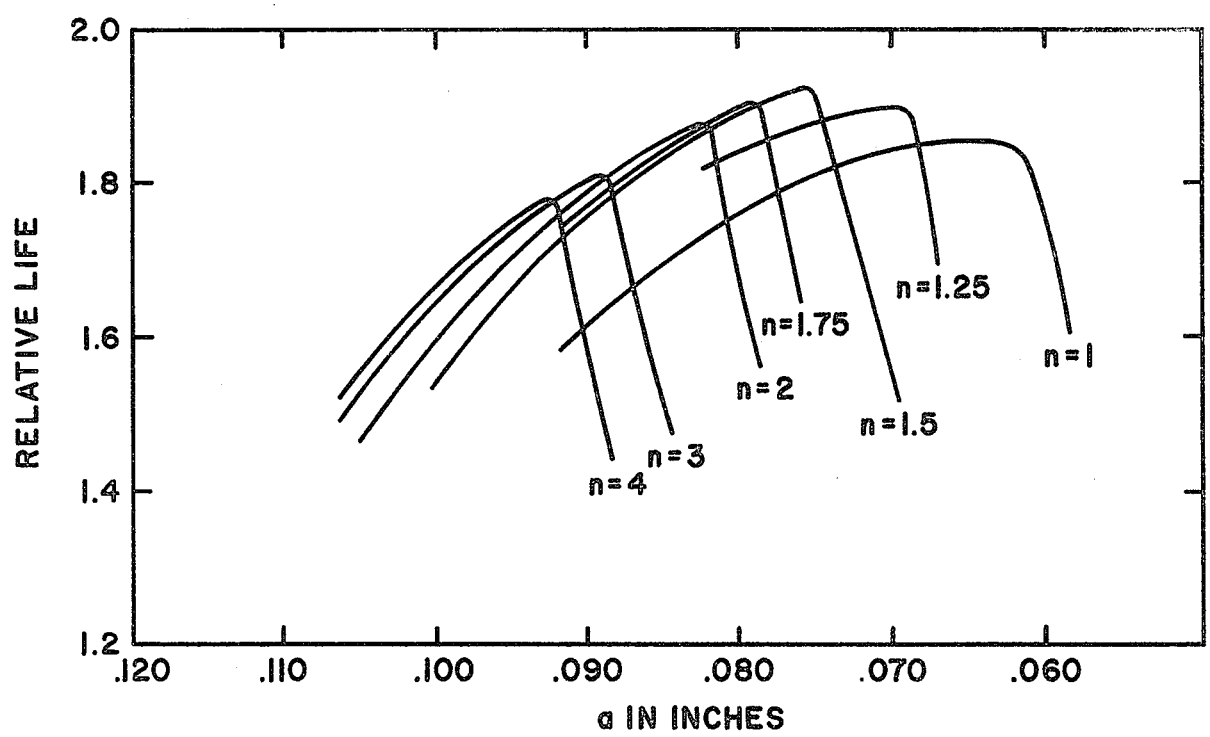
FIG. 5 illustrates the relationship of duct thickness at the center of a duct wall to the life of the duct.

In order to optimize the structural configuration, the duct flat cross-section was allowed to have the general shape 40 indicated in FIG. 4 which follows two part equation: $t = a + bx^n$ (where $0 \leq x \leq x^*$) (1) and $t = D$ (where $x^* \leq x \leq L$) (2); $n$ is a variable exponent, $a$ is the minimum thickness of the duct at the centerline, $x$ is the distance from the centerline, $x^*$ is the specific value of $x$ for which the thickness is equal to D which is the maxium desired thickness, and $b$ is a constant. $x^*$ will vary with values of $n$. These variables are governed by the constraint that the total metal volume associated with the cross-section is equal to that associated with the standard duct design having a constant cross-section of 0.120 inch thickness. D in FIG. 4 refers to the duct wall thickness at one end of the polygon sides. Inserting values of $a = 0.083$, $b = 0.09506$, and $n = 2$ in the above equation, $t$ is determined to be 0.150 (where $x^* \leq x \leq L$).

It is evident that the generalized shape equation indicated above allows for a wide variation in approximate shape. For example, as $n$ tends toward infinity, the cross-section is essentially a step function with a narrow section in the center and 0.150 inch thickness section at the corner. On the other hand, for $n = 1$, the cross-section has a "V" shape.

The time required for the duct of this invention at different thicknesses to penetrate the space envelope defined by the locus of points equally spaced between adjacent ducts will depend upon the neutron fluence dependence of irradiation creep. Since this dependence is still the subject of experimental investigation, a constant creep rate was assumed for the purpose of evaluating the relative life times of a standard duct and the duct described by this invention. This comparison was made with materials with identical irradiation creep properties. For each particular exponent $n$ chosen, a variety of minimum duct thicknesses $a$ can be obtained. FIG. 4 illustrates that as the minimum thickness is decreased, the projected life increases and eventually passes through a maximum. Different maxima are obtained for different values of exponents with the optimum exponent for maximum life occurring at a value of $n = 1.5$.

Figure 6:
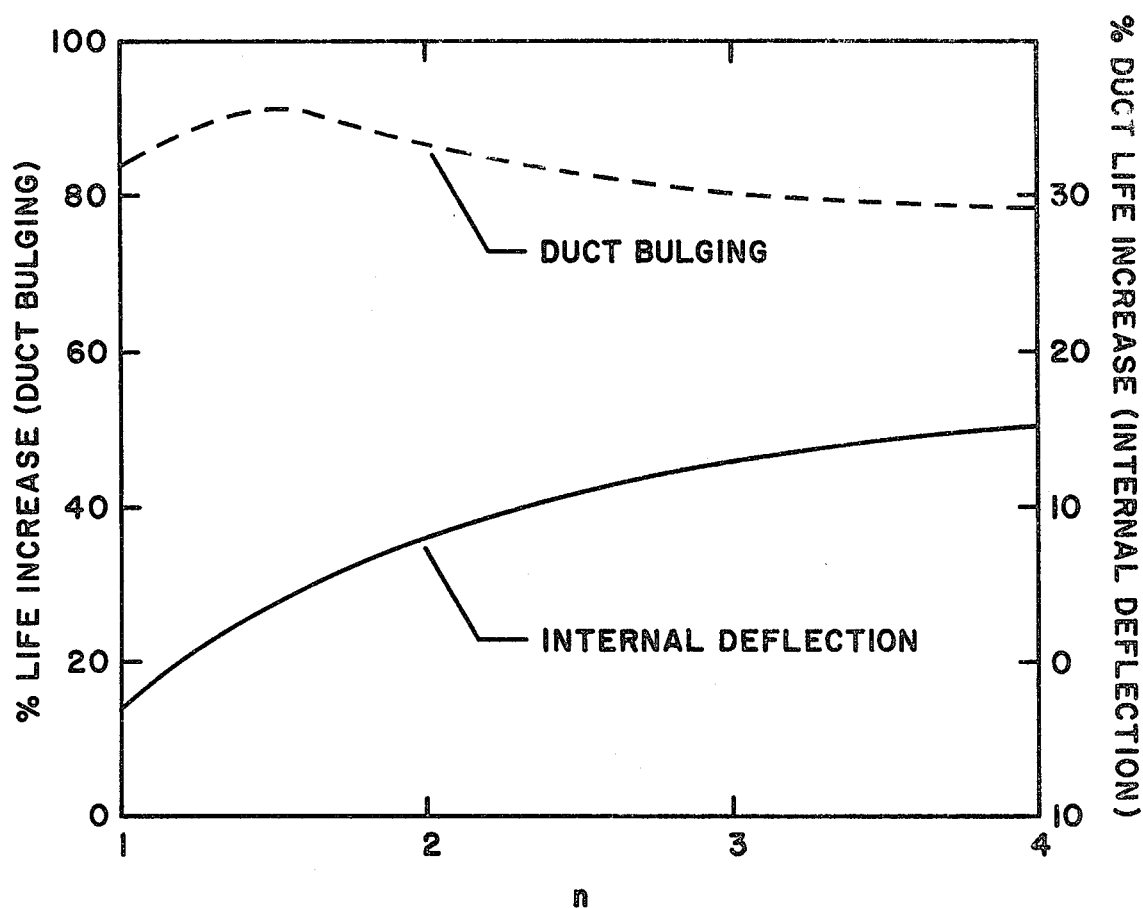
FIG. 6 illustrates the relationship of the duct wall shape with duct life.

FIG. 6 is a plot of maximum life as a function of the exponent $n$ obtained at optimum thickness for each exponent, and shows that the improved life is not extremely sensitive to the precise shape (i.e., value of variable $n$) as long as the general feature of the reduced section near the center and enlarged sections near the corner of the duct are obtained.

Although the maximum life was obtained for $n = 1.5$, the preferred duct shape for this invention is at $n = 2$ for several reasons, including the fact that the two duct lives are very similar (88% increase in life at $n = 2$ versus 92% increase in life for $n = 1.5$), the shape with $n = 2$ corresponds essentially to the shape associated with the constant radius of curvature which facilitates an easily specified shape on engineering drawings, the constant radius of curvature insures a minimum notch effect while at $n = 1.5$ a mild notch effect is detected in the center of the duct flat wall, and the shape with $n = 2$ provides about 8% increase in true deflection rigidity which would increase the hydraulic performance as compared to the approximately 4% increase in true deflection bulging ragidity for $n = 1.5$. The percent increase in true deflection rigidity indicates reduced internal deflections and shape change in the duct and, as a result, a reduced tendency for by-pass flow of sodium in the bulged regions.

Figure 7:
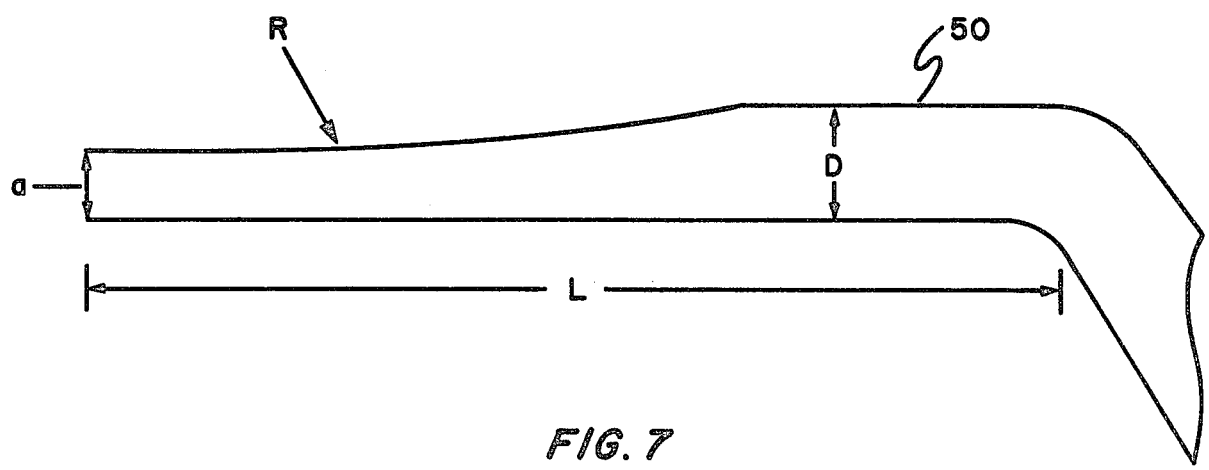
FIG. 7 illustrates a part of the preferred duct configuration.

A portion 50 of the preferred embodiment of this invention is illustrated in FIG. 7, wherein R equals 5.25 inches, $a$ equals about 0.083 inches, D equals about 0.150 inch, and L equals about 1.25 inches. L has the same value as currently used ducts. This shape has essentially the same volume of metal as a standard shape and provides the following increases in performance over standard ducts: 88% increase in life as defined by the "duct touching" life limiting criteria; 8% increase in true deflection rigidity (e.g., 8% increase in the time required to produce a 50 mil center deflection on the inner diameter of the duct flat) and therefore increased hydraulic performance; and no substantial increase in the longitudinal stiffness of the duct, which factor is important in controlling the withdrawal forces encountered during refueling for given swelling gradients and irradiation creep relaxation during irradiation.

Although the specific example in this disclosure is designed to increase the duct life through the improved strength of the variable thickness design. The design may be used to improve the breeding ratio at constant life. This may be done by reducing the wall thickness to obtain an equivalent life. Reduction of the wall thickness results in a decreased amount of stainless steel in the core and a subsequent increase in breeding ratio.

For a given shape, the duct life will vary approximately as the average thickness cubed so that the 80% improvement (at constant average thickness) due to shape corresponds to a 20% reduction in average thickness (at constant life) due to shape. If the reactor design (eg. duct pitch, fuel pin diameter, etc.) is fixed, the thickness may be reduced by machining the outside surfaces of the duct uniformly in which case the steel removed is replaced by a coolant. In this instance a breeding gain of about 0.01 has been determined. Much larger breeding gains may be obtained if the design is not fixed and the removed stainless steel is replaced by an increased volume of fuel.

It should be emphasized that this invention may be used to substantially increase the breeding ratio without reducing the life span of currently used ducts. In this application, the value of D would remain the same as currently used ducts and the other parameters would be assigned values which would effect retention of the same lifespan while reducing the thickness $a$ as per the equations noted hereinabove.

What we claim is:

1. A tubular coolant flow duct for housing fuel pins within said duct, said duct providing an improved breeding ratio and an increased lifespan, comprising said tubular flow duct having walls forming a regular polygonal cross-section, the thickness of said duct wall cross-section varying peripherally about said duct, said thickness being greatest adjacent corners of said polygon and least at a location intermediate said corners of said polygon, the inner surfaces of said tubular flow duct walls being flat and the outer surfaces of said tubular flow duct walls being concave, so that each of said walls is of reduced cross-section along the longitudinal center line of each wall and of greater cross-section along the wall end points to form said regular polygonal cross-section, said tubular flow duct with said varying wall thickness providing an increased life for said duct and an increased breeding ratio.

2. The duct of claim 1 having an improved breeding ratio over prior art ducts with equal life span.

3. The tubular flow duct of claim 1 wherein said tubular flow duct polygonal cross-section comprises a hexagonal cross-section, said tubular member having a regular hexagonal duct wall inner surface cross-section, and said walls being of maximum thickness at a point about the corners of said regular hexagonal cross-section and at a minimal thickness intermediate said corners of said hexagonal cross-section, said varying wall thickness providing increased bulging resistance and increased life for said duct.

4. The tubular flow duct of claim 1 wherein said tubular flow duct polygonal cross-section comprises a hexagonal cross-section, and the inner walls of said tubular member are of a configuration in accordance with the two part equation $t = a + bx^n$ (where $0 \leq x \leq x^*$) and $t = D$ (where $x^* \leq x \leq L$), wherein $n$ is a variable exponent, $a$ is the minimum thickness of the duct at the centerline, $x^*$ is the specific value of $x$ for which the thickness is equal to D which is the maximum desired thickness, and $b$ is a constant.

5. The duct of claim 4 wherein $n = 2$, $a = 0.083$ inches, and $b = 0.09506$, $L = 1.25$ inches and the thickness of said duct wall is 0.150 inches.

6. The duct of claim 5 having an at least 80% increased life span (based upon constant creep rate) over prior art ducts with equal breeding ratio.

* * * * *